Aug. 19, 1958 T. W. KUCHARSKI 2,848,554

COMBINED CRADLE AND SWITCH ACTUATOR

Filed Jan. 13, 1954

INVENTOR
THADDEUS W. KUCHARSKI
BY J. Warren Whitesel
ATTORNEY

United States Patent Office 2,848,554

Patented Aug. 19, 1958

2,848,554

COMBINED CRADLE AND SWITCH ACTUATOR

Thaddeus W. Kucharski, Rochester, N. Y., assignor, by mesne assignments, to General Dynamics Corporation, a corporation of Delaware Application January 13, 1954, Serial No. 403,833

5 Claims. (Cl. 179—100)

This invention relates to telephone subsets and more particularly to combined cradle and plunger switch actuator assemblies especially adapted to a combination wall and desk type telephone.

One object of this invention is to provide a new and improved combined cradle and plunger switch actuator assembly for a combination desk and wall-type telephone sub-set.

Another object of this invention is to provide an integral, two-position cradle and plunger.

These and other objects will be apparent from a study of the attached drawings and the following description.

Figures 1, 2, 3:
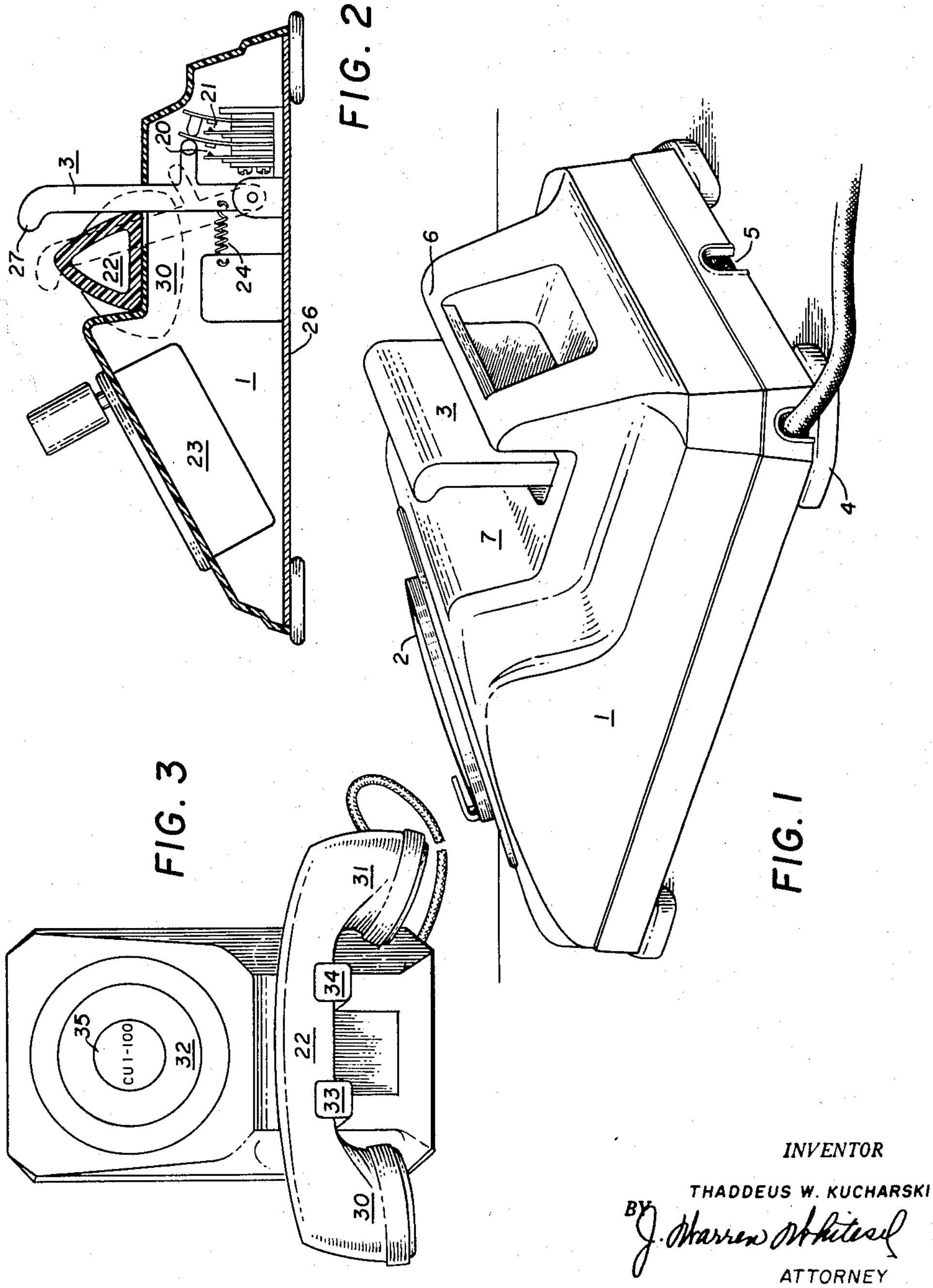
Fig. 1 shows a perspective view of my invention as it may be adapted to a dial type telephone.
Fig. 2 shows a side view of Fig. 1 with the side removed so that the hook switch assembly may be seen. This telephone is an adaptation wherein the dial is replaced by a magneto generator.
Fig. 3 shows a top view of the telephone illustrating how it is adapted to wall use together with an adaptation of the combined cradle and plunger and an arrangement for operation in a manual system.

Referring to the drawings more specifically, Fig. 1 shows a telephone housing assembly 1, which is provided with a suitable calling device such as dial 2, and a combined cradle and plunger switch actuator assembly—the cradle plunger being shown as element 3. The housing assembly may be made of any suitable substance, such as molded Bakelite, for example; furthermore, it may be adapted to fit over a base plate suitable for carrying the telephone's components and having foot support members 4. A suitably fashioned recess 5 is provided for receiving means to secure the housing unit to the base plate. The molded housing also may be provided with a hand hold 6 by means of which the telephone may be readily carried from place to place.

Recess 7, which is defined by molded housing 1 and cradle-plunger 3, is adapted to receive a telephone hand set of more or less conventional design comprising a transmitter and receiver suitably joined by a hand-holding portion. When the hand set is in place in recess 7, cradle-plunger switch actuator assembly 3 is urged rearwardly to open contacts in the hook switch assembly and when the hand set is removed from recess 7, cradle-plunger 3 is moved forward under the influence of a spring to complete the talking circuit through the hook switch assembly.

This arrangement is shown in greater detail in Fig. 2 wherein cradle-plunger 3 is shown by solid lines in its rearward position where it is held by a cam action under the influence of telephone hand set 22 in which position hook switch contacts 20 and 21 are opened. When hand set 22 is removed from its cradled position, cradle plunger 3 moves under the influence of spring 24 to the forward position as shown in dotted lines thereby allowing contacts 20 and 21 to close so that supervision, signaling and conversation may follow.

Fig. 2 is also illustrates an adaptation involving a magneto type ringing generator 23 which may be inserted in housing assembly 1 in place of dial 2 which is shown in Fig. 1. Since Fig. 2 shows the telephone used as a desk set, transmitter 30 is shown in dotted lines as hanging downwardly under the influence of gravity. If this telephone should be used for wall service, it would be rotated by 90° and base plate 26 would be bolted to the wall. Then, hand set 22 would be supported on cradle-plunger 3, being held in place by bend or portion 27.

Fig. 3 shows this manner in which the telephone may be mounted for wall use. In this arrangement the hand set is positioned with the receiver and transmitter portions 30 and 31 rotated 90° with respect to the position shown in Fig. 2. In either mounting, the cradle-plunger moves in the same manner either under the urging of spring 24 or of gravity when hand set 22 is in position. Fig. 3 shows the cradle-plunger as a bifurcated element divided into sections 33 and 34 to facilitate grasping the hand set. In the modification of Fig. 3 the space normally filled by either dial 2 or magneto generator 23 is closed over by a blank 32 carrying a telephone identifying number disk 35. In this case it is assumed that the phone is used for manual service and therefore a signaling device is not necessary.

It should be obvious that blank 32 could be replaced by any desired devices. For example, a plurality of signal buttons could be provided.

Various modifications will be apparent from the foregoing description and therefore it is my intention to claim not only the specific modifications shown but also any other modifications which may fall within the true spirit of my invention.

What I claim is:

1. In a combination desk and wall type telephone subset, a telephone hand set, a housing assembly, a recess in said housing adapted to cradle said telephone hand set, an outstanding, elongated switch actuator positioned adjacent one side of said recess, means for pivotally mounting said switch actuator, said switch actuator being adapted to move on said pivot at an angle to said elongated dimension under the influence of said hand set when cradled, said housing and said switch actuator being shaped to cooperate in positioning said hand set in either of two positions, one of said two positions being displaced 90° with respect to the other of said two positions, a hook switch spring assembly, and means responsive to motion of said switch actuator for actuating said hook switch spring assembly.

2. The telephone set of claim 1 wherein said housing assembly is provided with a slope-faced front portion, means in said front portion defining an opening adapted to receive telephone components.

3. The telephone set of claim 2 wherein said housing assembly is provided with a hand hold portion positioned to define one wall of said recess.

4. The telephone set of claim 1 wherein said switch actuator is a bifurcated assembly having two outwardly extending arms including a bent portion adjacent one end thereof, said bent portion being shaped to support and retain said hand set.

5. A telephone subset comprising a housing, a hand set, a spring assembly, a unitary switch actuator for actuating said spring assembly, said switch actuator being shaped to support said hand set in one of two positions rotated 90° with respect to the other of said two positions, said housing and said switch actuator being shaped to cooperate in positioning said hand set in said other of said two positions, whereby, said switch actuator may provide said subset with means for either desk or wall mounting without further modification.

(References on following page)

References Cited in the file of this patent

UNITED STATES PATENTS

| | | |
|---|---|---|
| 1,418,764 | Williams | June 6, 1922 |
| 2,089,386 | Lum | Aug. 10, 1937 |
| 2,215,860 | Sengebusch | Sept. 24, 1940 |
| 2,558,699 | Bjerknes | June 26, 1951 |
| 2,654,811 | Boswau et al. | Oct. 6, 1953 |

FOREIGN PATENTS

| | | |
|---|---|---|
| 688,809 | Great Britain | Mar. 11, 1953 |